Aug. 3, 1943.  H. E. YOUNG ET AL  2,325,899
VOLTAGE REGULATOR SYSTEM
Filed Feb. 8, 1940
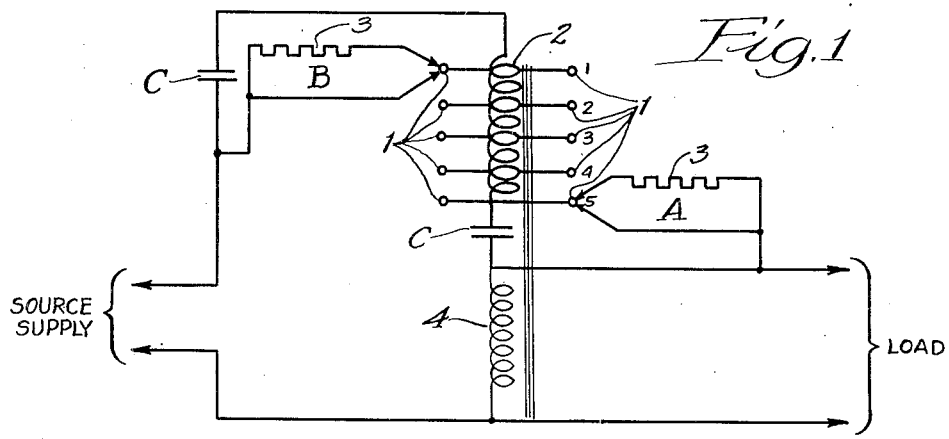
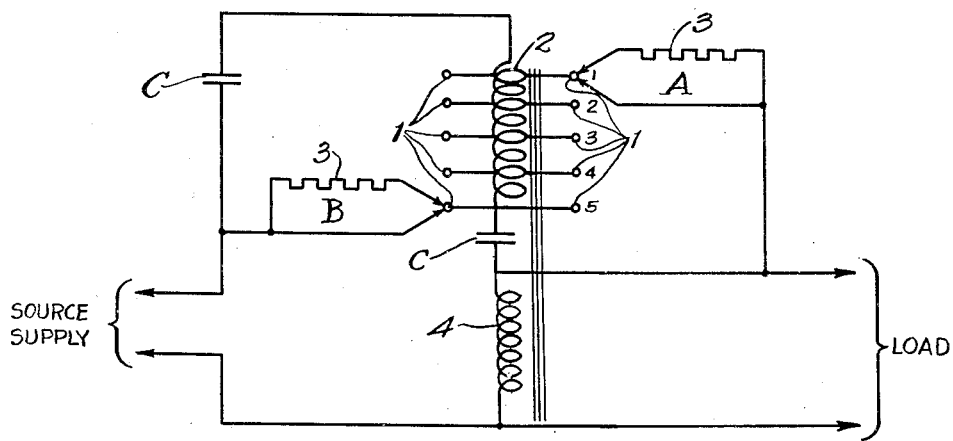
Inventors:
Eugene H. Haug
and Hugh E. Young,
By Kummler Kummler & Davis
Attorneys.
Witnesses:
W. A. Snow
H. I. Debert Patented Aug. 3, 1943.

2,325,899

UNITED STATES PATENT OFFICE 2,325,899

VOLTAGE REGULATOR SYSTEM

Hugh E. Young and Eugene H. Haug, Chicago, Ill., assignors to Hugh E. Young, trustee of Young & Haug Trust Estate Application February 8, 1940, Serial No. 317,856

6 Claims. (Cl. 171—119)

Our invention herein described and claimed relates generally to the stabilization of power line voltages and especially to the minimizing and prevention of voltage variations at remote points on a line carrying high potential alternating current. Heretofore various means have been used for this purpose, but these have been subject to serious defects and shortcomings.

The main object of our invention is to combine condensive and inductive reactances into a regulating system having tap changing equipment, in order to maintain constant voltage at a distant power center. Heretofore tap changing equipment has been exclusively used, or capacitative reactances in themselves individually. In combining both the capacitative reactance and the tap changing equipment it affords better regulation and higher apparatus economy. When tap changing equipment alone was used the trouble that usually occurred was due to the great number of tap changes required at normal load. This caused deterioration of contact points and wear and tear on the operating mechanism. Since 80% of the voltage drops are generally due to the reactance in the line, it would be unnecessary to have a tap change made in order to get a correct voltage value, since capacitative reactance would neutralize the inductive reactance and therefore, obviate the necessity of tap change.

Our said invention is illustrated by the accompanying drawing, in which:

Figure 1 is a circuit diagram of a preferred embodiment of our invention, with the voltage control apparatus set in its maximum buck position.

Fig. 2 is a similar diagram with the apparatus set in its maximum boost position.

Maintenance of constant voltage at the receiving busses or load center of a variable load transmission system, even where there is wide fluctuation in the load, may be accomplished either by means of a synchronous condenser or by the introduction of voltage control apparatus at some convenient point. For instance, one may use induction regulators or load ratio control.

The former method using a condenser, maintains constant voltage, at the receiving bus, by adjusting the line power factor so that the line drop between receiving and sending busses remains constant for all loads. The latter method, using voltage control apparatus, permits the line drop to vary with the load, but nevertheless maintains constant voltage on the receiving bus by inserting in the system a variable condensive voltage.

Although the two methods are radically different in principle, they are both being used extensively. The essential characteristics of the two methods are compared for the purpose mainly of indicating how a third method forming the basis of our present invention and consisting of a combination of load ratio control and capacitors may combine advantageously the desirable performance characteristics of the synchronous condenser and the load ratio control. We have found that:

(1) With the use of such a combination equipment, appreciable saving may be expected in the overall system loss, both at no load and at full load, as compared with either a synchronous condenser or load ratio control. (2) The capacitative kilovolt amperes required in the combination equipment is much less than when the synchronous condenser is used. (3) The transformer tap range is less than when the standard load ratio control is used.

The conclusion is reached that the combination equipment is superior under the following conditions:

(a) Where increased kilovolt amperes available to the system by use of the synchronous condenser is not of sufficient value to justify the extra cost involved.

(b) Where the advantages inherent in the synchronous condenser by virtue of its being a rotating device are not important.

(c) Where the economies resulting from power factor correction justify the increase in the first cost as compared with the standard load ratio control.

In view of the advantages inherently possessed by the combination equipment there are obviously many practical situations in which this method is preferable and to be recommended.

Description of the combination method

A bank of static capacitors may be so interconnected with a tap changing transformer that the value of the capacitative kilovolt amperes introduced into the circuit will be a function of the tap on which the transformer is operating and hence a function of the load.

More in detail, Fig. 1 is a diagram of one arrangement showing an autotransformer with taps 1 in series winding 2. By means of contacts A and B, provided with resistors 3, the incoming and outgoing lines may be connected to any of the taps 1. Said contacts A and B are moved alternately and in opposite directions by means of a conventional load ratio control mechanism. The position of the contacts shown in Fig. 1, (A on the tap numbered 5 and B on the tap numbered 1) corresponds to the maximum buck position, which in general is the no load operating position.

In the other extreme position, which is the maximum boost position, the contact A will be on the tap numbered 1 and contact B on the tap numbered 5 as shown in Fig. 2, corresponding in general to the full load condition. Capacitors C are connected between the series and shunt winding 2 and 4 respectively, in such a manner that in the maximum buck position the voltages cross, that is, they are at zero, while in the maximum boost position they receive the full voltage of the series winding 2. Thus, it is evident that at light loads, at which the equipment will be operating at or near its maximum buck position, no leading current will be introduced into the lines. Conversely at full load at which the equipment will be operating at or near its maximum boost position, maximum leading current will be introduced into the lines By this means the output voltage can be maintained constant automatically, either at the transformer terminals or at the load center with the aid of a line drop compensator, and simultaneously, leading current can be introduced into the circuit roughly proportionate to the amount of load.

This combination scheme of control has characteristics similar to the synchronous condenser in that increasing leading kilovolt amperes are thrown on the system with increasing load, and at the same time voltages held constant at the receiving busses. It differs fundamentally from the synchronous condenser in that voltage control is obtained by changing transformer ratio as well as by changing leading kilovolt amperes, whereas the synchronous condenser voltage control is obtained by controlling the amount of reactive kilovolt amperes, leading or lagging, that the condenser introduced into the system. On this account, especially if the synchronous condenser is used for mtaining constant voltage under all load conditions, the resulting power factor will not always be the most desirable. This is especially evident at light loads, under which conditions a synchronous condenser is circulating lagging reactive kilovolt amperes in the system to prevent excessive voltage from appearing on the receiving busses.

Therefore, the combination scheme of control using variable transformer ratio together with variable reactive kilovolt amperes provides, from this point of view, a superior method of holding constant voltage. Furthermore, the kilovolt ampere rating of the synchronous condenser for a given condition may be appreciably greater than the maximum leading kilovolt rating on the load ratio power drop, because a rating depends not only upon the economy power factor at which the system should operate at full load, but also upon the requirements of maintaining the voltage constant on the system. Thus it is found, that the leading kilovolt rating on the synchronous condenser is about twice the capacitor rating for a similar performance.

It is to be understood that some of the details set forth may be altered or omitted without departing from the spirit of our invention as defined by the following claims.

We claim:

1. An alternating current power transmission system comprising a step-type voltage regulator in combination with two capacitors, the latter being connected in series on one side of the line, and said regulator comprising a series winding in series circuit relation between the two said capacitors, and an exciting winding connected shuntwise across the output terminals of the regulator.

2. In a constant potential alternating current system a step-type voltage regulator, having two tap changing equipments, a series winding and an exciting winding in combination with two series capacitors, said series capacitors being connected in series circuit relation one at each end of the series winding and correlated with the tap changing equipments respectively in a manner to introduce a leading voltage into the constant potential system proportionate to the amount of tap change.

3. An alternating current power transmission system comprising in combination a step-type voltage regulator and two capacitors, the latter being connected in series on one side of the line, and said regulator comprising a series winding in series circuit relation between the two said capacitors, contact leads respectively bridging said capacitors, and an exciting winding connected shuntwise across the output terminals of said regulator.

4. In an alternating current power transmission system, a network having an autotransformer with a series winding and a shunt winding, and two series condensive reactances, said series condensive reactances being connected in series circuit relation with the load one on each of the opposite sides of the series winding of said autotransformer.

5. In an alternating current electric power transmission system, means to prevent remote variations in voltage, said means comprising a multitap autotransformer, a pair of resistors, a pair of capacitors, and conventional means to shift connections to the autotransformer taps, one of said resistors and one of said capacitors being connected on one side of the supply circuit, the one capacitor to the outer end of the tapped part of the autotransformer winding and the one resistor variably to the taps thereof, the other capacitor being connected in series in said winding between the tapped and untapped parts, the other resistor being connected variably to said tapped part shuntwise to one side of the load circuit, which side is connected to a point between the second said condenser and the untapped part of said winding, and said resistor connections to said tapped part being differentially shiftable 6. In an alternating current electric power transmission system, means to prevent remote variations in voltage, said means comprising a multitap autotransformer, a pair of impedances, a pair of capacitors, and conventional means to shift connections to the autotransformer taps, one of said impedances and one of said capacitors being connected on one side of the supply circuit, the one capacitor to the outer end of the tapped part of the autotransformer winding and the one impedance variably to the taps thereof, the other capacitor being connected in series in said winding between the tapped and untapped parts, the other impedance being connected variably to said tapped part shuntwise to one side of the load circuit, which side is connected to a point between the second said condenser and the untapped part of said winding, and said impedance connections to said tapped part being differentially shiftable.

HUGH E. YOUNG.
EUGENE H. HAUG.